US008095237B2

(12) United States Patent
Habibi et al.

(10) Patent No.: US 8,095,237 B2
(45) Date of Patent: Jan. 10, 2012

(54) METHOD AND APPARATUS FOR SINGLE IMAGE 3D VISION GUIDED ROBOTICS

(75) Inventors: Babak Habibi, North Vancouver (CA); Simona Pescaru, North Vancouver (CA); Mohammad Sameti, Coquitlam (CA); Remus Florinel Boca, North Vancouver (CA)

(73) Assignee: RoboticVISIONTech LLC, Great Falls, VA (US)

( * ) Notice: Subject to any disclaimer, the term of this patent is extended or adjusted under 35 U.S.C. 154(b) by 525 days.

(21) Appl. No.: 10/634,874

(22) Filed: Aug. 6, 2003

(65) Prior Publication Data

US 2004/0172164 A1 Sep. 2, 2004

Related U.S. Application Data

(63) Continuation-in-part of application No. 10/153,680, filed on May 24, 2002, now Pat. No. 6,816,755.

(30) Foreign Application Priority Data

Jan. 31, 2002 (CA) .................................... 2369845

(51) Int. Cl.
*G06F 19/00* (2006.01)

(52) U.S. Cl. ........ 700/245; 700/246; 700/253; 700/257; 700/258; 700/259; 318/568.13; 318/568.15; 318/568.16; 318/640; 29/702; 29/714; 29/720; 901/6; 901/14; 901/17; 901/46; 901/47

(58) Field of Classification Search .................. 348/287, 348/291, 154, 190, 42, 94, 552, 191; 901/14, 901/17, 46–47, 6; 414/730, 737; 382/154, 382/103, 106, 276, 293, 295, 298; 700/245–246, 700/257–259, 253, 279; 29/407.04, 714, 29/407.1, 702, 720, 218; 318/568.15, 568.13, 318/568.16, 640
See application file for complete search history.

(56) References Cited

U.S. PATENT DOCUMENTS

| 3,986,007 | A | | 10/1976 | Ruoff, Jr. |
| 4,011,437 | A | | 3/1977 | Hohn ..................... 235/151.11 |
| 4,146,924 | A | * | 3/1979 | Birk et al. ..................... 700/259 |
| 4,187,454 | A | | 2/1980 | Ito et al. ......................... 318/568 |
| 4,219,847 | A | | 8/1980 | Pinkney et al. |
| 4,294,544 | A | | 10/1981 | Altschuler et al. ............ 356/376 |
| 4,305,130 | A | * | 12/1981 | Kelley et al. .................. 700/259 |

(Continued)

FOREIGN PATENT DOCUMENTS

DE 19515949 A1 11/1996

(Continued)

OTHER PUBLICATIONS

Wei et al., Multisensory visual servoing by a neural network, 1999, IEEE, p. 276-280.*

(Continued)

*Primary Examiner* — James Trammell
*Assistant Examiner* — McDieunel Marc
(74) *Attorney, Agent, or Firm* — Seed IP Law Group PLLC

(57) ABSTRACT

A method of three-dimensional object location and guidance to allow robotic manipulation of an object with variable position and orientation using a sensor array which is a collection of one or more sensors capable of forming a single image.

28 Claims, 7 Drawing Sheets

U.S. PATENT DOCUMENTS

| | | | |
|---|---|---|---|
| 4,334,241 A | 6/1982 | Kashioka et al. | |
| 4,402,053 A | 8/1983 | Kelley et al. | |
| 4,437,114 A * | 3/1984 | LaRussa | 348/94 |
| 4,523,809 A | 6/1985 | Taboada et al. | 350/163 |
| 4,578,561 A | 3/1986 | Corby, Jr. et al. | 219/124.34 |
| 4,613,942 A * | 9/1986 | Chen | 700/259 |
| 4,654,949 A * | 4/1987 | Pryor | 29/407.04 |
| 4,687,325 A | 8/1987 | Corby, Jr. | 356/1 |
| 4,791,482 A | 12/1988 | Barry et al. | 358/107 |
| 4,835,450 A | 5/1989 | Suzuki | 318/568.13 |
| 4,871,252 A * | 10/1989 | Beni et al. | 356/457 |
| 4,879,664 A | 11/1989 | Suyama et al. | 364/518 |
| 4,942,539 A * | 7/1990 | McGee et al. | 700/253 |
| 4,985,846 A | 1/1991 | Fallon | 364/513 |
| 5,083,073 A | 1/1992 | Kato | 318/577 |
| 5,160,977 A | 11/1992 | Utsumi | 356/376 |
| 5,208,763 A | 5/1993 | Hong et al. | 364/551.02 |
| 5,212,738 A | 5/1993 | Chande et al. | |
| 5,300,869 A * | 4/1994 | Skaar et al. | 318/587 |
| 5,325,468 A | 6/1994 | Terasaki et al. | 395/97 |
| 5,350,269 A | 9/1994 | Azuma et al. | 414/416 |
| 5,446,835 A | 8/1995 | Iida et al. | 395/133 |
| 5,454,775 A | 10/1995 | Cullen et al. | 483/16 |
| 5,461,478 A | 10/1995 | Sakakibara et al. | 356/375 |
| 5,499,306 A | 3/1996 | Sasaki et al. | 382/291 |
| 5,521,830 A | 5/1996 | Saito | 364/474.34 |
| 5,568,593 A | 10/1996 | Demarest et al. | 395/82 |
| 5,608,818 A | 3/1997 | Chini et al. | 382/153 |
| 5,633,676 A * | 5/1997 | Harley et al. | 348/95 |
| 5,696,673 A * | 12/1997 | Pryor | 700/66 |
| 5,715,166 A | 2/1998 | Besl et al. | 364/474.24 |
| 5,745,523 A | 4/1998 | Dent et al. | 375/216 |
| 5,784,282 A | 7/1998 | Abitbol et al. | 364/474.28 |
| 5,802,201 A | 9/1998 | Nayar et al. | 382/153 |
| 5,809,006 A | 9/1998 | Davis et al. | 369/275.4 |
| 5,870,527 A | 2/1999 | Fujikawa et al. | 395/80 |
| 5,956,417 A * | 9/1999 | Pryor | 382/154 |
| 5,959,425 A * | 9/1999 | Bieman et al. | 318/568.15 |
| 5,974,169 A | 10/1999 | Bachelder | 382/151 |
| 5,978,521 A | 11/1999 | Wallack et al. | |
| 6,004,016 A | 12/1999 | Spector | 364/167.02 |
| 6,044,183 A * | 3/2000 | Pryor | 382/287 |
| 6,064,759 A | 5/2000 | Buckley et al. | 382/154 |
| 6,081,370 A * | 6/2000 | Spink | 359/369 |
| 6,115,480 A | 9/2000 | Washizawa | |
| 6,141,863 A * | 11/2000 | Hara et al. | 29/714 |
| 6,167,607 B1 * | 1/2001 | Pryor | 29/407.04 |
| 6,211,506 B1 | 4/2001 | Pryor et al. | |
| 6,236,896 B1 | 5/2001 | Watanabe et al. | |
| 6,278,906 B1 | 8/2001 | Piepmeier et al. | 700/250 |
| 6,301,763 B1 * | 10/2001 | Pryor | 29/407.04 |
| 6,341,246 B1 | 1/2002 | Gerstenberger et al. | 700/245 |
| 6,392,744 B1 | 5/2002 | Holec | 356/4.03 |
| 6,463,358 B1 | 10/2002 | Watanabe et al. | 700/259 |
| 6,466,843 B1 | 10/2002 | Bonanni et al. | 700/245 |
| 6,490,369 B1 | 12/2002 | Beiman | 382/153 |
| 6,516,092 B1 | 2/2003 | Bachelder et al. | 382/181 |
| 6,529,627 B1 | 3/2003 | Callari et al. | 382/154 |
| 6,546,127 B1 | 4/2003 | Seong et al. | 382/152 |
| 6,549,288 B1 | 4/2003 | Migdal et al. | 356/603 |
| 6,580,971 B2 | 6/2003 | Bunn et al. | 700/259 |
| 6,594,600 B1 * | 7/2003 | Arnoul et al. | 702/94 |
| 6,628,819 B1 | 9/2003 | Huang et al. | |
| 6,721,444 B1 | 4/2004 | Gu et al. | 382/154 |
| 6,724,930 B1 | 4/2004 | Kosaka et al. | 382/154 |
| 6,741,363 B1 | 5/2004 | Kaupert | 356/602 |
| 6,748,104 B1 | 6/2004 | Bachelder et al. | 382/151 |
| 6,754,560 B2 * | 6/2004 | Fujita et al. | 700/245 |
| 6,804,416 B1 | 10/2004 | Bachelder et al. | 382/294 |
| 6,816,755 B2 * | 11/2004 | Habibi et al. | 700/259 |
| 6,836,702 B1 | 12/2004 | Brogårdh et al. | 700/245 |
| 6,853,965 B2 * | 2/2005 | Massie et al. | 703/6 |
| 6,970,802 B2 | 11/2005 | Ban et al. | 382/153 |
| 7,006,236 B2 | 2/2006 | Tomasi et al. | 356/614 |
| 7,009,717 B2 | 3/2006 | Van Coppenolle et al. | 356/603 |
| 7,024,280 B2 * | 4/2006 | Parker et al. | 700/245 |
| 7,061,628 B2 | 6/2006 | Franke et al. | |
| 7,084,900 B1 | 8/2006 | Watanabe et al. | 348/94 |
| 7,177,459 B1 | 2/2007 | Watanabe et al. | 382/151 |
| 7,693,325 B2 * | 4/2010 | Pulla et al. | 382/154 |
| 2001/0034481 A1 * | 10/2001 | Horn | 600/407 |
| 2001/0055069 A1 * | 12/2001 | Hudson | 348/302 |
| 2002/0019198 A1 | 2/2002 | Kamono | 451/41 |
| 2002/0028418 A1 * | 3/2002 | Farag et al. | 433/29 |
| 2002/0156541 A1 | 10/2002 | Yutkowitz | 700/28 |
| 2002/0159628 A1 * | 10/2002 | Matusik et al. | 382/154 |
| 2003/0004694 A1 * | 1/2003 | Aliaga et al. | 703/2 |
| 2003/0007159 A1 | 1/2003 | Franke et al. | |
| 2003/0182013 A1 | 9/2003 | Moreas et al. | 700/145 |
| 2003/0202691 A1 * | 10/2003 | Beardsley | 382/154 |
| 2004/0037689 A1 | 2/2004 | Watanabe et al. | 414/730 |
| 2004/0041808 A1 | 3/2004 | Ban et al. | 345/419 |
| 2004/0073336 A1 | 4/2004 | Huang et al. | 700/245 |
| 2004/0081352 A1 | 4/2004 | Ban et al. | 382/154 |
| 2004/0114033 A1 | 6/2004 | Eian et al. | 348/42 |
| 2004/0172164 A1 | 9/2004 | Habibi et al. | |
| 2004/0193321 A1 | 9/2004 | Anfindsen et al. | 700/257 |
| 2004/0233461 A1 * | 11/2004 | Armstrong et al. | 356/620 |
| 2005/0002555 A1 | 1/2005 | Kumiya et al. | 382/153 |
| 2005/0097021 A1 | 5/2005 | Behr et al. | 705/36 |
| 2005/0126833 A1 | 6/2005 | Takenaka et al. | 180/8.1 |
| 2005/0233816 A1 | 10/2005 | Nishino et al. | 473/131 |
| 2005/0246053 A1 | 11/2005 | Endou et al. | 700/188 |
| 2005/0273202 A1 | 12/2005 | Bischoff | |
| 2006/0025874 A1 | 2/2006 | Huffington et al. | 700/44 |
| 2006/0088203 A1 | 4/2006 | Boca et al. | 382/153 |
| 2006/0119835 A1 | 6/2006 | Rastegar et al. | 356/28 |
| 2006/0210112 A1 | 9/2006 | Cohen et al. | 382/103 |
| 2007/0073439 A1 | 3/2007 | Habibi et al. | 700/213 |
| 2010/0040255 A1 * | 2/2010 | Rhoads | 382/100 |

FOREIGN PATENT DOCUMENTS

| | | | |
|---|---|---|---|
| DE | 102 36 040 | | 2/2004 |
| DE | 10319253 A1 | | 12/2004 |
| EP | 0 114 505 | * | 8/1984 |
| EP | 0114505 A1 | | 8/1984 |
| EP | 0151417 | | 8/1985 |
| EP | 0493612 | | 7/1992 |
| EP | 0763406 | | 3/1997 |
| EP | 0763406 A1 | | 3/1997 |
| EP | 0911603 B1 | | 4/1999 |
| EP | 0951968 | | 10/1999 |
| EP | 1 043 126 | | 10/2000 |
| EP | 1 043 642 | | 10/2000 |
| EP | 1 043 689 | | 10/2000 |
| EP | 1172183 A2 | | 1/2002 |
| EP | 1345099 A2 | | 9/2003 |
| EP | 1 484 716 | | 12/2004 |
| JP | 63288683 | | 11/1988 |
| JP | 01124072 | | 5/1989 |
| JP | 401124072 | | 5/1989 |
| JP | 07311610 | | 11/1995 |
| JP | 10049218 | | 2/1998 |
| JP | 2000024973 | | 1/2000 |
| JP | 2002018754 | | 1/2002 |
| WO | 9806015 | | 2/1998 |
| WO | 0106210 A1 | | 1/2001 |
| WO | 2005/074653 | | 8/2005 |

OTHER PUBLICATIONS

Kim, Computer vision assisted virtual reality calibration, 1999, Internet, p. 450-464.*

Bejczy, Challenges of human-robot communication in telerobotics, 1996, IEEE, p. 1-8.*

Sharma, Visual servoing with independently controlled cameras using a learned invariant representation, 1998, IEEE, p. 3263-3268.*

Crowley et al., Maintaining stereo calibration by tracking image points, 1993, IEEE, pp. 483-488.*

Chandrashaker et al., Robotics and structural dynamics characterization of the space station remote manipulator system using photogrammetric techniques, 1994, IEEE, pp. 691-694.*

Triboulet et al., Finding 3D polyhedral object attitude using a virtual model for industrial machining, 2001, IEEE, pp. 57-65.*

Zhaohui et al., Image registration using a 3-D scene representation, 1998, IEEE, pp. 828-832.*

Safaee-Rad et al., Three-dimensional location estimation of circular features for machine vision, 1992, IEEE, pp. 624-640.*

Safaee-Rad et al., An analytical method for the 3D-location estimation of circular features for an active-vision system, IEEE, pp. 215-220.*

Xu et al., Determining Camera Intrinsic and Extrinsic Parameters from Multiple Images of Multiple Balls, 2002, Internet, pp. 1-5.*

Roger Y. Tsai and Reimar K. Lenz, "A New Technique for Fully Autonomous and Efficient 3D Robotics Hand/Eye Calibration", *IEEE Transactions on Robotics and Automation*, vol. 5, No. 3, Jun. 1989 p. 345.

Zhengyou Zhang, "A Flexible New Technique for Camera Calibration", http://research.microsoft.com/scripts/pubs/view.asp?TR_ID=MSR-TR-98-71.

Guo-Qing Wei, Klaus Arbter, and Gerd Hirzinger, "Active Self-Calibration of Robotic Eyes and Hand-Eye Relationship with Model Identification", *IEEE Transactions on Robotics and Automation*, vol. 14, No. 1, Feb. 1998 p. 158.

Yuncai Liu, Thomas S. Huang and Olivier D. Faugeras, "Determination of Camera Location from 2-D to 3-D Line and Point Correspondences", *IEEE Transactions on Pattern Analysis and Machine Intelligence*, vol. 12, No. 1, Jan. 1990 p. 28.

Chien-Ping Lu, Gregory D. Hager and Eric Mjolsness, "Fast and Globally Convergent Pose Estimation from Video Images", *IEEE Transactions on Pattern Analysis and Machine Intelligence*, vol. 22, No. 6, Jun. 2000 p. 610.

Thomas Huang, Alfred M. Bruckstein, Robert J. Holt, and Arun N. Netravali, "Uniqueness of 3D Pose Under Weak Perspective: A Geometrical Proof", IEEE Transactions on Pattern Analysis and Machine Intelligence, vol. 17, No. 12, Dec. 1995 p. 1220.

U.S. Appl. No. 60/413,180, filed Sep. 23, 2002, Eian et al.

Denzler, J., et al., "Learning, Tracking and Recognition of 3D Objects," *Proceedings of the IEEE/RSJ/GI International Conference on Intelligent Robots and Systems*, no date available.

"Advanced Robotic Systems and the Real World," *Proceedings of the International Conference on Intelligent Robots and Systems (IROS)*, XP000512662, vol. 1, Munich, Sep. 12, 1994, pp. 89-96.

W. Meyer, "One-Eyed Robots With 3D Vision," ISRA Vision Systems AG, Press News, Release No. 16, Jun. 15, 2004, pp. 1-7.

"3D Robot Guidance with a Single Camera," ISRA Vision Systems AG, no date available.

3D Vision with One Camera, URL=http://neu.isravision.com/likecms/index.php?site=site.html&dir=isra&nav=162, download date Apr. 12, 2005.

U.S. Appl. No. 60/587,488, filed Jul. 14, 2004, Boca et al.

Borotschnig, H., et al., "Appearance-Based Active Object Recognition," Image and Vision Computing, 18:715-727, 2000.

Chen, L., et al., "An investigation on the accuracy of three-dimensional space reconstruction using the Direct Linear Transformation Technique," J. Biomechanics 27(4):493-500, 1994.

Denzler J., et al., "Learning, Tracking and Recognition of 3D Objects," Proceedings of the IEEE/RSJ/GI, International Conference on Intelligent Robots and Systems (IROS) 1:89-96, 1994.

Ji, Q., et al., "An Integrated Linear Technique for Pose Estimation from different Geometric Features," International Journal of Pattern Recognition and Artificial Intelligence, 13(5):705-733, Aug. 1999.

Jia, Y-B., et al., "Sensing Polygon Poses by Inscription," Proc. of 1994 IEEE International Conference on Robotics and Automation, pp. 1642-1649, May 1994.

Kim, W.S., "Computer vision assisted virtual reality calibration," URL=http:www.robotics.jpl.nasa.gov/publications/ Won_Kim/ra98_vrc.pdf., pp. 1-14, 1999.

Kovacic, S., et al., "Planning Sequences of Views for 3-D Object Recognition and Pose Determination," Pattern Recognition 31(10):1407-1417, 1998.

Sanchez, A., et al., "Robot-arm Pick and Place Behavior Programming System Using Visual Perception," in Proceedings of the 15th International Conference on Pattern Recognition 4:507-510, Sep. 2000.

Tsai, R. et al., "An Efficient and Accurate Camera Calibration Technique for 3D Machine Vision," Proceedings of IEEE, Conference on Computer Vision and Pattern Recognition, pp. 364-374, 1986.

Tsai, R., "A Versatile Camera Calibration Technique for High-Accuracy 3D Machine Vision Metrology Using Off-theShelf TV Cameras and Lenses," IEEE Journal of Robotics and Automation, RA-3(4):323-344, Aug. 1987.

Roger Y. Tsai and Reimar K. Lenz, "A New Technique for Fully Autonomous and Efficient 3D Robotics Hand/Eye Calibration", *IEEE Transactions on Robotics and Automation*, vol. 5, No. 3, Jun. 1989 p. 345.

Guo-Qing Wei, Klaus Arbter, and Gerd Hirzinger, "Active Self-Calibration of Robotic Eyes and Hand-Eye Relationship with Model Identification", *IEEE Transactions on Robotics and Automation*, vol. 14, No. 1, Feb. 1998 p. 158.

Yuncai Liu, Thomas S. Huang and Olivier D. Faugeras, "Determination of Camera Location from 2-D to 3-D Line and Point Correspondences", IEEE Transactions on Pattern Analysis and Machine Intelligence, vol. 12, No. 1, Jan. 1990 p. 28.

Chien-Ping Lu, Gregory D. Hager and Eric Mjolsness, "Fast and Globally Convergent Pose Estimation from Video Images", IEEE Transactions on Pattern Analysis and Machine Intelligence, vol. 22, No. 6, Jun. 2000 p. 610.

Thomas Huang, Alfred M. Bruckstein, Robert J. Holt, and Arun N. Netravali, "Uniqueness of 3D Pose Under Weak Perspective: A Geometrical Proof", IEEE Transactions on Pattern Analysis and Machine Intelligence, vol. 17, No. 12, Dec. 1995 p. 1220.

Nelson et al., "Robotic Visual Servoing and Robotic Assembly Tasks," IEEE Robotics & Automation Magazine 3 (2):23-31, 1996.

Zhang, "A Flexible New Technique for Camera Calibration," Technical Report MSR-TR-98-71, Microsoft Corporation, Dec. 2, 1998, 22 pages.

U.S. Appl. No. 11/754,218, filed May 25, 2007, Habibi et al.
U.S. Appl. No. 11/779,812, filed Jul. 18, 2007, Habibi.
U.S. Appl. No. 11/833,187, filed Aug. 2, 2007, Boca et al.
U.S. Appl. No. 11/857,680, filed Sep. 19, 2007, Boca et al.
U.S. Appl. No. 60/719,765, filed Sep. 23, 2005, Habibi et al.
U.S. Appl. No. 60/808,903, filed May 26, 2006, Habibi et al.
U.S. Appl. No. 60/832,356, filed Jul. 20, 2006, Habibi.
U.S. Appl. No. 60/845,932, filed Sep. 19, 2006, Boca et al.
U.S. Appl. No. 60/875,073, filed Dec. 16, 2006, Beis et al.

Aloimonos, J., et al., "Active Vision," *IEEE*, pp. 35-54, 1987.

Anonymous, "Precise Length Measurement at VSM (Vereinigte Schmirgel-Und Maschinen-Fabriken AG)," *News of the Astech GmbH* 2001(4), Dec. 31, 2001.

Bajcsy, R., "Active Perception," *Proc. IEEE* 76(8):996-1005, 1988.

Bakhtari, A., et al., "Active-Vision Based Multi-Sensor Surveillance—An Implementation," *IEEE Transactions on Systems, Man and Cybernetics, Part C: Applications and Reviews*, 36(5):668-680, Sep. 2006.

Borotschnig, H., et al., "Active Object Recognition in Parametric Eigenspace," *Proc. 9th British Machine Vision Conference*, pp. 629-638, 1998.

Bouthemy, P., "A Maximum Likelihood Framework for Determining Moving Edges," *IEEE Trans. Pattern Analysis and Machine Intelligence* 11(5):499-511, 1989.

Brown, M., et al., "3D Model Acquisition by Tracking 2D Wireframes," *Proc. 11th British Machine Vision Conference*, pp. 656-665, 2000.

Callari, F., et al., "Active Recognition: Using Uncertainty to Reduce Ambiguity," *Proc. 13th International Conference on Pattern Recognition*, pp. 925-929, 1996.

Chaumette, F., "Potential Problems of Stability and Convergence in Image-Based and Position-Based Visual Servoing," in D. Kriegman, G. Hager and S. Morse, editors, *The Confluence of Vision and Control*, vol. 237 of Lecture Notes in Control and Information Sciences, pp. 66-78, Springer-Verlag, 1998.

Chaumette, F., et al., "Structure from Controlled Motion," *IEEE Trans. Pattern Analysis and Machine Intelligence* 18(5):492-504, May 1996.

Constantinescu, D., et al., "Smooth and Time-Optimal Trajectory Planning for Industrial Manipulators along Specified Paths," *Journal of Robotic Systems* 17(5):233-249, 2000.

Corke, P.I., et al., "A New Partitioned Approach to Image-Based Visual Servo Control," *IEEE Trans. On Robotics and Automation* 17(4):507-515, Aug. 2001.

Deguchi, K., "Optimal Motion Control for Image-Based Visual Servoing by Decoupling Translation and Rotation," in *Proc. Int. Conf Intelligent Robots and Systems*, pp. 705-711, Oct. 1998.

Drummond, T., et al., "Real-time Tracking of Complex Structures with On-line Camera Calibration," *Proceedings of British Machine Vision Conference*, pp. 574-583, 1999.

Eriksen, R.D., et al., "Classification and pose estimation of unconstrained 3D objects," *34th International Symposium on Robotics*, Jun. 2-5, 2003, 7 pages.

Hartley et al., *Multiple View Geometry in Computer Vision*, Cambridge University Press, Cambridge, 2000.

Holliday et al., "Demonstration of Automated Robotic Workcell for Hazardous Waste Characterization," *Proceedings of the International Conference on Robotics and Automation* 3(10):788-794, May 2, 1993.

Hutchinson, S.A., et al., "Planning Sensing Strategies in a Robot Work Cell with Multi-Sensor Capabilities," *IEEE Trans. Robotics and Automation* 5(6):765-783, 1989.

Hutchison et al., "A Tutorial on Visual Servo Control," *IEEE Transactions on Robotics and Automation* 12(5), Oct. 1996.

Lowe, D.G., "Robust Model-based Motion Tracking Through the Integration of Search and Estimation," *International Journal of Computer Vision* 8(2):113-122, 1992.

Macfarlane, S., et al., "Jerk-Bounded Manipulator Trajectory Planning. Design for Real-Time Applications," *IEEE Trans. Robotics and Automation* 19(1):42-52, 2003.

Marjanovic et al., "Self-Taught Visually-Guided Pointing for a Humanoid Robot," XP-002220054, pp. 35-44, 1996.

Miura, J., et al., "Task-Oriented Generation of Visual Sensing Strategies in Assembly Tasks," CMU School of Computer Science Tech Report CMU-CS-95-116, 42 pages, 1995.

Motai, Y., et al., "Concatenate Feature Extraction for Robust 3D Elliptic Object Localization," *Proc. Of the 19th ACM Symposium on Applied Computing*, pp. 21-28, 2004.

Murase, H., et al., "Visual Learning and Recognition of 3-D Objects from Appearance," *International Journal of Computer Vision* 14(1):5-24, 1995.

Naish, M.D., et al., "Coordinated dispatching of proximity sensors for the surveillance of manoeuvring targets," *Journal of Robotics and Computer Integrated Manufacturing* 19(3):283-299, 2003.

Nomura et al., "Integrated Visual Servoing System to Grasp Industrial Parts Moving on Conveyer by Controlling 6D0F Arm," *Systems, Man, and Cybernetics, 2000 IEEE International Conference* 3:1768-1775, Oct. 2000.

Papanikolopoulos et al., "Six Degree-of-Freedom Hand/Eye Visual Tracking with Uncertain Parameters," *IEEE Transactions on Robotics and Automation* 11(5):725-732, Oct. 1995.

Sang, T., et al., "Vision Assisted Robotic Tele-training," *IEEE International Conference on Mechatronics and Automation*, pp. 1288-1293, Jul. 2005.

Tarabanis, K.A., et al., "A Survey of Sensor Planning in Computer Vision," *IEEE Transactions on Robotics and Automation* 11(1):86-104, Feb. 1995.

Tarabanis, K.A., et al., "The MVP Sensor Planning System for Robotic Vision Tasks," *IEEE Transactions on Robotics and Automation* 11(1):72-85, Feb. 1995.

Vincze, M., "Robust tracking of ellipses at frame rate," *The Journal of Pattern Recognition* 34(2):487-498, 2001.

Whaite, P., et al., "From Uncertainty to Visual Exploration," *IEEE Transactions on Pattern Analysis and Machine Intelligence* 13(10):1038-1049, 1991.

Wilson et al., "Relative End-Effector Control Using Cartesian Position Based Visual Servoing," IEEE Transactions 12(5):684-696, 1996.

Zhou, F., et al., "Complete calibration of a structured light stripe vision sensor through planar target of unknown orientations," *Image and Vision Computing* 23:59-67, 2005.

Office Action for U.S. Appl. No. 11/183,228, 12 pages, mail date Dec. 6, 2006.

Amendment filed in U.S. Appl. No. 11/183,228, 24 pages., Apr. 5, 2007.

Office Action for U.S. Appl. No. 11/183,228, 14 pages, Mail Date Jun. 8, 2007.

Amendment filed in U.S. Appl. No. 11/183,228, 8 pages, Mail Date Sep. 4, 2007.

Wilson, et al., "Relative End-Effector Control Using Cartesian Position Based Visual Servoing," IEEE Transactions on Robotics and Automation, 12(5):684-696, Oct. 1996.

"3D Robot Guidance with a Single Camera," ISRA Vision Systems AG, Machine Vision for Robot Guidance, Nashville, Tennessee, Oct. 5, 2004.

\* cited by examiner

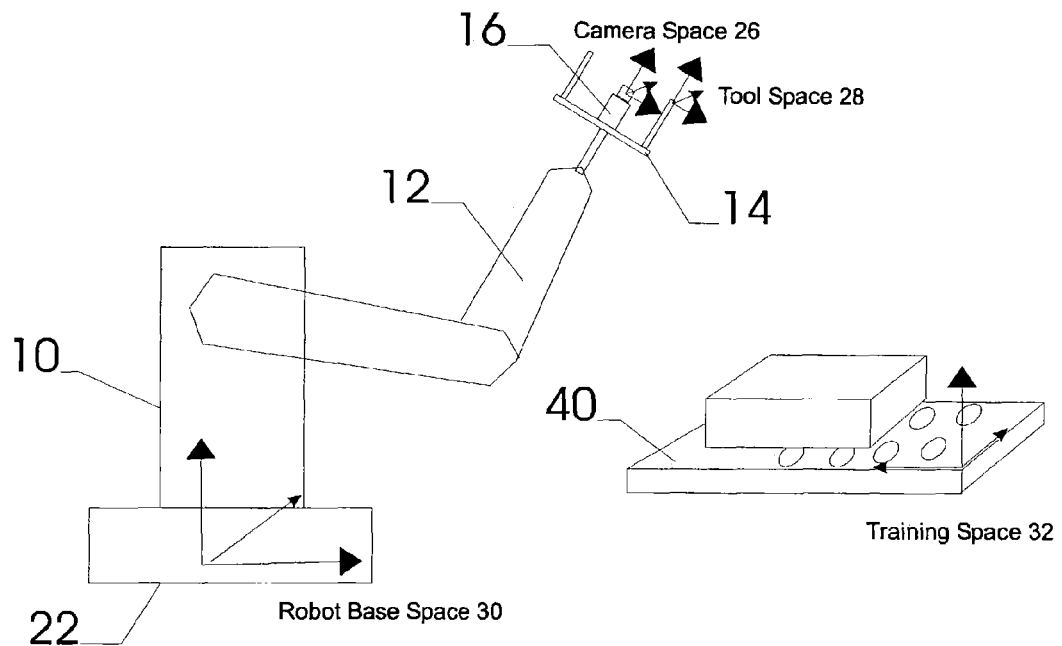
Fig. 2
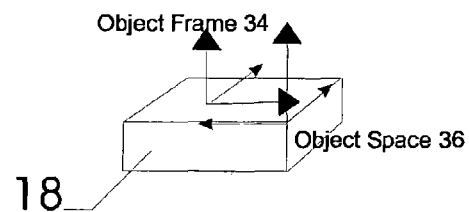

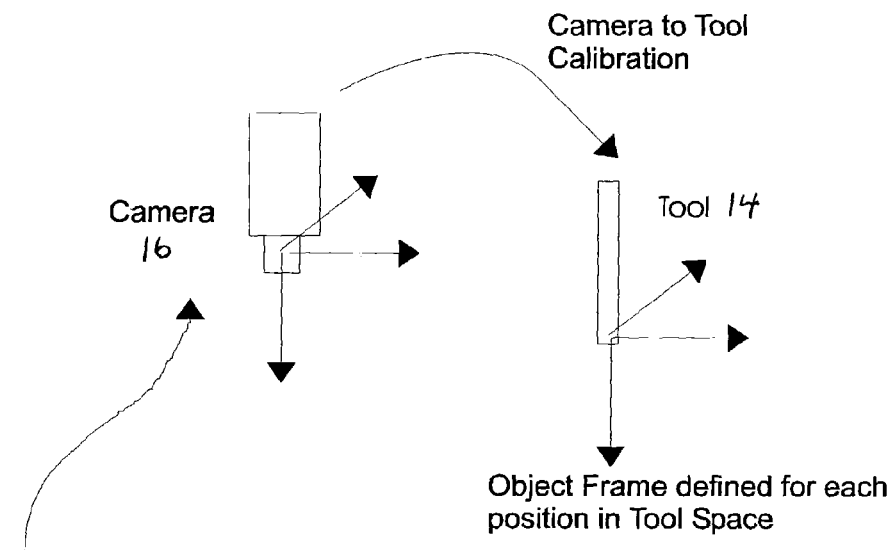
Camera to Tool Calibration
Camera 16
Tool 14
Object Frame defined for each position in Tool Space
Fig. 3
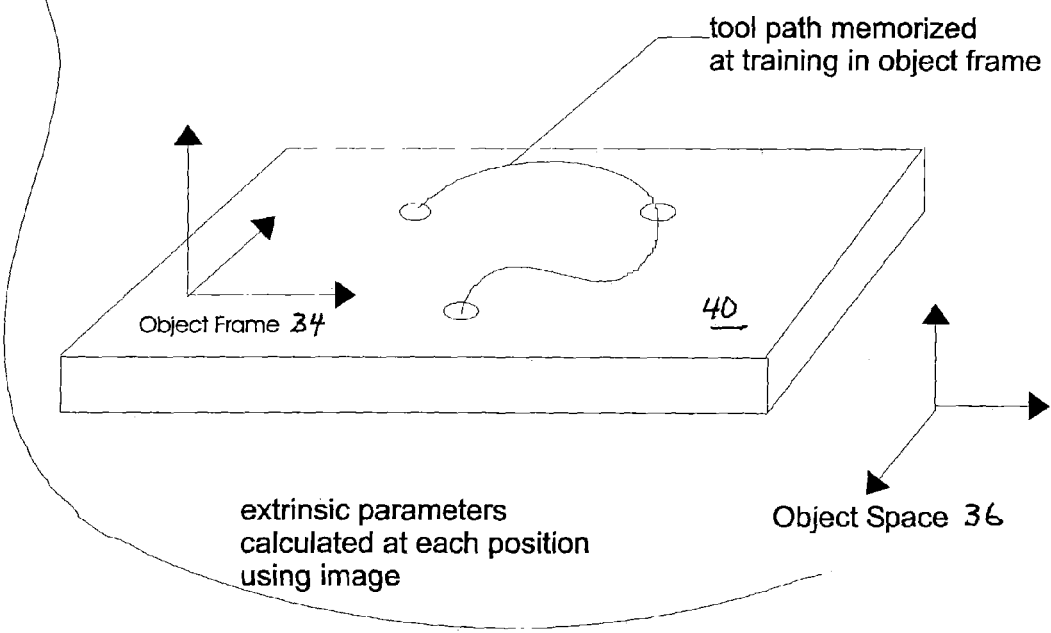
tool path memorized at training in object frame
Object Frame 34
40
extrinsic parameters calculated at each position using image
Object Space 36

Calibration of the camera mounted on the robot arm

```
┌─────────────────────────────────────────────────────────────┐
│ Position the camera on the robot arm so it is orthogonal to │
│ the "Calibration Model". Define the "Training Space" for    │
│ the robot aligned with the template used for calibration    │
└─────────────────────────────────────────────────────────────┘
                              │
                              ▼
┌─────────────────────────────────────────────────────────────┐
│ Compute camera intrinsic parameters and the "Camera Space-> │
│ Training Space" transformation                              │
└─────────────────────────────────────────────────────────────┘
                              │
                              ▼
┌─────────────────────────────────────────────────────────────┐
│ Compute "Camera Space -> Tool Space"                        │
│ transformation using the "Camera Space->                    │
│ Training Space" transformation and inquiring                │
│ the robot about the "Tool" position in "Training            │
│ Space"                                                      │
└─────────────────────────────────────────────────────────────┘
```

FIG. 5

METHOD AND APPARATUS FOR SINGLE IMAGE 3D VISION GUIDED ROBOTICS

CROSS-REFERENCE TO RELATED APPLICATIONS

This application is a continuation-in-part of U.S. patent application Ser. No. 10/153,680, filed May 24, 2002 now U.S. Pat. No. 6,816,755 which is pending.

TECHNICAL FIELD

The invention relates to the field of vision guided robotics, and more particularly to a method and apparatus for single image three dimensional vision guided robotics.

BACKGROUND

Robots have long been widely used in manufacturing processes for many applications. Many different types of sensors are used to guide robots but machine vision is increasingly being used to guide robots in their tasks. Typically such machine vision is used in a two-dimensional application wherein the target object need only be located in an x-y plane, using a single camera. For example see U.S. Pat. No. 4,437,114 LaRussa. However many robotic applications require the robot to locate and manipulate the target in three dimensions. In the past this has typically involved using two or more cameras. For example see U.S. Pat. No. 4,146,924 Birk et al.; and U.S. Pat. No. 5,959,425 Bieman et al. In order to reduce hardware costs and space requirements it is preferable to use a single camera. Prior single camera systems however have used laser triangulation which involves expensive specialized sensors, must be rigidly packaged to maintain geometric relationships, require sophisticated inter-tool calibration methods and tend to be susceptible to damage or misalignment when operating in industrial environments.

Target points on the object have also been used to assist in determining the location in space of the target object using single or multiple cameras. See U.S. Pat. No. 4,219,847 Pinkney et al. and U.S. Pat. Nos. 5,696,673; 5,956,417; 6,044,183 and 6,301,763 all of Pryor and U.S. Pat. No. 4,942,539 of McGee et al. Typically these methods involve computing the position of the object relative to a previous position, which requires knowledge of the 3D pose of the object at the starting point. These methods also tend to not provide the accuracy and repeatability required by industrial applications. There is therefore a need for a method for calculating the 3D pose of objects using only standard video camera equipment that is capable of providing the level of accuracy and repeatability required for vision guidance of robots as well as other applications requiring 3D pose information of objects.

SUMMARY OF INVENTION

A method of three-dimensional object location and guidance to allow robotic manipulation of an object with variable position and orientation by a robot using a sensor array is provided the method comprises: a) calibrating the sensor array to provide a Robot—Eye Calibration by finding the intrinsic parameters of said sensor array and the position of the sensor array relative to a preferred robot coordinate system ("Robot Frame") by placing a calibration model in the field of view of said sensor array; (b) training object features by: i) positioning the object and the sensor array such that the object is located in the field of view of the sensor array and acquiring and forming an image of the object; ii) selecting at least 5 visible object features from the image; iii) creating a 3D model of the object ("Object Model") by calculating the 3D position of each feature relative to a coordinate system rigid to the object ("Object Space"); (c) training a robot operation path by: (i) computing the "Object Space→Sensor Array Space" transformation using the "Object Model" and the positions of the features in the image; (ii) computing the "Object Space" position and orientation in "Robot Frame" using the transformation from "Object Space→Sensor Array Space" and "Robot—Eye Calibration"; (iii) coordinating the desired robot operation path with the "Object Space"; (d) carrying out object location and robot guidance by: (i) acquiring and forming an image of the object using the sensor array, searching for and finding said at least 5 trained features; ii) with the positions of features in the image and the corresponding "Object Model" as determined in the training step, computing the object location as the transformation between the "Object Space" and the "Sensor Array" and the transformation between the "Object Space" and "Robot Frame"; (iii) communicating said computed object location to the robot and modifying robot path points according to said computed object location.

The invention further provides a system for carrying out the foregoing method.

BRIEF DESCRIPTION OF DRAWINGS

In drawings which illustrate a preferred embodiment of the invention:

FIG. 2 is a schematic diagram illustrating the relative frames of reference for calculating the position of the object;

FIG. 3 is a schematic diagram illustrating the calculation of the intended operation path on the object;

FIG. 5 is a flow chart illustrating the calibration of the camera mounted on the robot arm;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
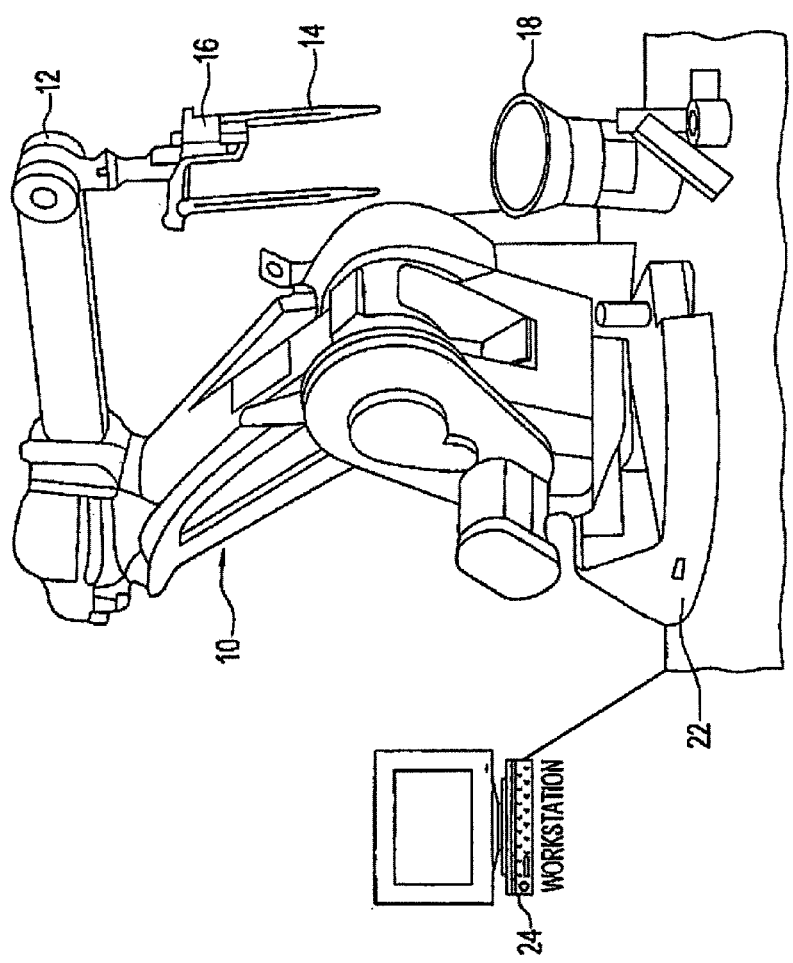
FIG. 1 is a perspective view of a vision-guided robot.

FIG. 1 shows a robot 10 having a manipulating arm 12, base 22 and attached tool 14 with camera 16 mounted thereon. Tool 14 is designed to manipulate a part or target object 18. Camera 16 is preferably a commercially available analog or digital video camera. Camera 16 and robot 10 are electrically connected to computer control station 24 for communication of data back and forth.

The method is performed in the main steps described as follows:
  a) calibration of the camera;
  b) teaching the features on the object; and
  c) finding the three-dimensional pose of the object and using this information to guide the robot to approach the object to perform any operations (e.g. handling, cutting etc.).

In the following discussion the following terms have the following meanings, as illustrated in FIG. 2:

Transformation: three-dimensional rotation & translation between two spaces;

Tool 14: the tool the robot is using for performing the handling, cutting or other robotic operations, having an operating end or "end-effector";

Camera Space 26: a reference frame defined with respect to a point on, and therefore rigid to, the camera 16;

Tool Space 28: a reference frame defined with respect to a point on, and oriented along the direction of the end-effector and therefore rigid to, the tool 14;

Robot base Space 30: a reference frame defined with respect to the physical base of the robot arm and therefore rigid to, the robot base 30;

Robot Frame: a preferred robot coordinate system Calibration Model or Calibration Pattern or Calibration Template: a physical object with features of whose relative geometry is known Sensor Array: a collection of one or more sensors capable of forming a single image Training Space 32: a reference frame defined with respect to a point on the calibration template 40, and aligned to its main axes;

Object Space 36: a reference frame defined with respect to, and therefore rigid to, the object 18;

Object Frame 34: a reference frame defined with respect to a point on, and therefore rigid to, the object 18;

Camera calibration intrinsic parameters: focal length, image center, real pixel size, and radial and tangential distortion for the lens;

Camera calibration extrinsic parameters: rotation and translation of an external space relative to the Camera Space 26.

Calibration

The calibration process involves: i) finding the camera intrinsic parameters and ii) the position of the camera relative to the tool of the robot ("hand-eye" calibration). The position of the camera in the "Training Space", which is a space rigid to the place where the object will be trained is also determined. A general explanation of the basic calibration algorithms and descriptions of the variables can be found in the following publications:

"An Efficient and Accurate Camera Calibration Technique for 3D Machine Vision", Roger Y. Tsai, Proceedings of IEEE Conference on Computer Vision and Pattern Recognition, Miami Beach, Fla., 1986, pages 364-374;

"A Versatile Camera Calibration Technique for High-Accuracy 3D Machine Vision Metrology Using Off-the-Shelf TV Cameras and Lenses", Roger Y. Tsai, IEEE Journal of Robotics and Automation, Vol. RA-3, No. 4, August 1987, pages 323-344.

"Tsai's Camera Calibration Method Revisited" http://www.ai.mit.edu/people/bkph/papers/tsaiexplain.pdf Tsai's camera model is based on the pin-hole model of perspective projection. Given the position of a point in 3D world coordinates, the model predicts the position of the point's image in 2D pixel coordinates. Tsai's model has 11 parameters: five internal (also called intrinsic or interior) parameters:

i) f—effective focal length of the pin hole camera;
ii) kappal—1st order radial lens distortion coefficient;
iii and iv) Cx, Cy—coordinates of center of radial lens distortion and the piercing point of the camera coordinate frame's Z axis with the camera's sensor plane;
v) sx—scale factor to account for any uncertainty due to framegrabber horizontal scanline resampling, and six external (also called extrinsic or exterior) parameters:

i) Rx, Ry, Rz—rotation angles of the transformation between the world and camera coordinate frames, and
ii) Tx, Ty, Tz—translation components of the transformation between the world and camera coordinate frames.

The internal parameters describe how the camera forms an image while the external parameters describe the camera's pose (i.e. position and orientation) in the world coordinate frame. Calibration data for the model consists of 3D (x,y,z) world coordinates of a feature point (in mm. for example) and corresponding 2D coordinates (Xf,Yf) (typically in pixels) of the feature point in the image. Two forms of calibration are possible:

coplanar—the calibration points lie in a single plane in 3D, and non-coplanar—the calibration points occupy a 3D volume.

As illustrated in FIGS. 2 and 5, the first step in calibration is to position the camera 16 on the robot arm 12 so it is orthogonal to a template 40 using the mirror approach, and defining the "Training Space" for the robot aligned with the template 40 used for calibration. A calibration template 40 is placed on the floor or other planar surface. It is a flat piece of paper, plastic or other medium having a series of fixed detectable features such as a grid of dots or squares. The camera 16 is positioned so that it is orthogonal to the plane of the calibration template 40, that is, so the camera's imaging plane is parallel to the template 40. The mirror approach for obtaining orthogonality comprises placing a flat mirror on the grid of the template 40 and centering the lens on the mirror in the center of the grid.

Next the camera intrinsic parameters and the "Camera→Training Space" transformation are computed considering the Training Space. Next, the "Camera→Tool" transformation is computed using the "Camera→Training Space" transformation and inquiring the robot about the "Tool" position in "Training Space". To calculate the "Camera→Tool" transformation manually, the operator first touches 3 identifiable points on the grid having known coordinates with the tool. Next the operator stores images of the grid from at least 2 and preferably 4 measured heights above the grid.

Alternatively, the calibration can be done automatically to compute both the camera intrinsic parameter and the hand-eye calibration. The technique requires the camera to observe a planar pattern shown at a plurality of (at least two) different orientations. The pattern can be printed on a laser printer and attached to a planar surface. The position of the tool at each station is acquired directly from the robot. The operator positions the calibration pattern in front of the robot and camera and starts the procedure. The automatic calibration takes place in less than 5 minutes. The calibration can be carried out in a different location from the part training or manipulation. The calibration pattern can be mounted in a fixed position, out of the working space, and automatic calibration can take place at regular time intervals.

The following steps are carried out to perform the automatic calibration:

a) the calibration pattern is positioned in the field of view of the robot mounted camera 16;

b) the robot is moved to a plurality of stations in a predefined manner so that the calibration pattern is in the field of view at each station (see Roger Y. Tsai and. Reimar K. Lenz, "A New Technique for Fully Autonomous and Efficient 3D Robotics Hand/Eye Calibration", *IEEE Transactions on Robotics and Automation*, Vol. 5, No. 3, June 1989 p. 345 at p. 350);

c) At each station the following operations are performed:
   the acquired image is processed to extract the calibration points from the image;
   the robot is asked for the tool position;
d) Using the calibration points information at each station, calibrate the camera intrinsic parameters and compute the extrinsic transformation from the pattern to the camera;
e) Using the extrinsic transformation at each station and the corresponding tool position, the camera to tool transformation is calculated (see Tsai and Lenz reference above at p. 350).

Teaching

Teaching the object is the process of:
a) Selection from the object's image of a set of at least 5 features, and determining the position of the features in the image. Features can be edges, holes, corners, blobs (extracted from the image) or simply a region of the image which will be used in a pattern match. Preferably, one or more unique features may be selected to be considered the "anchor features". The other selected features may be small, non-unique features relative to the anchor features.
b) Real world coordinates are computed for the selected features. The object is located in the Training Space, so that by using the features' heights relative to the Training Space, the 3D position of the object features inside the Training Space can be computed using the position in the image and the Training Space to Camera Space transformation calculated at calibration.
c) An Object Space is defined such that it is identical to the Training Space but is rigid to the object and moves with the object.
d) Also an Object Frame will be defined with a constant relationship to the object, in a position selected by the user. Three non-co-linear points may be used to define the Object Frame.
e) The Object Frame (computed in tool coordinates) is sent to the robot to be considered as the robot working space. To find this frame position, the transformation from Object Space to Camera Space is used, then from Camera Space to Tool Space.
f) Relative to the Object Frame, the operator can train the intended operation path (the tool path shown in FIG. 3) for the robot by moving the robot or alternatively by using an off-line robot programming software application to create the desired operation path with respect to the object.

Figure 4:
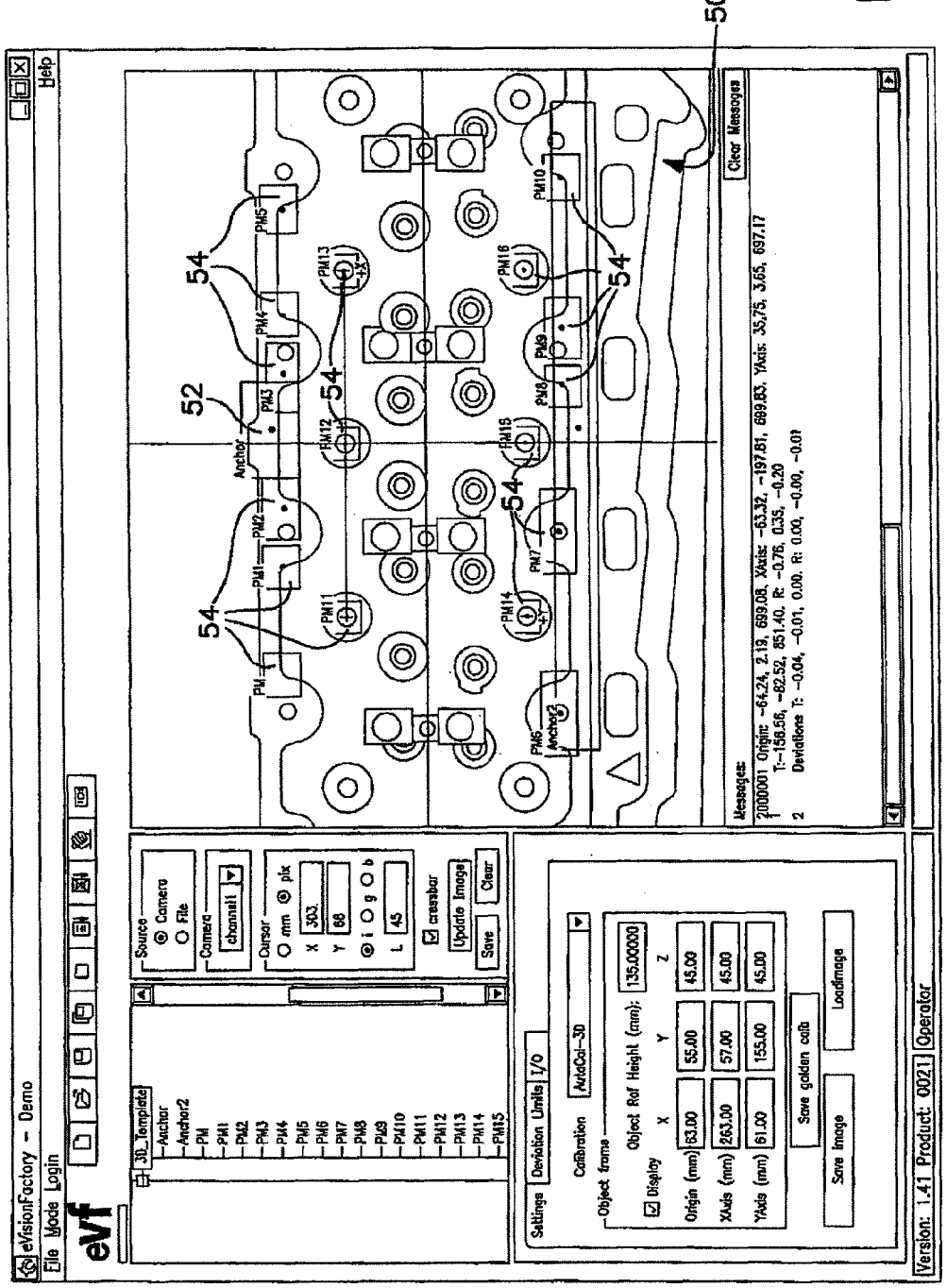
FIG. 4 is a representation of the operator's computer screen for selecting reference features on the object.
Figure 6:
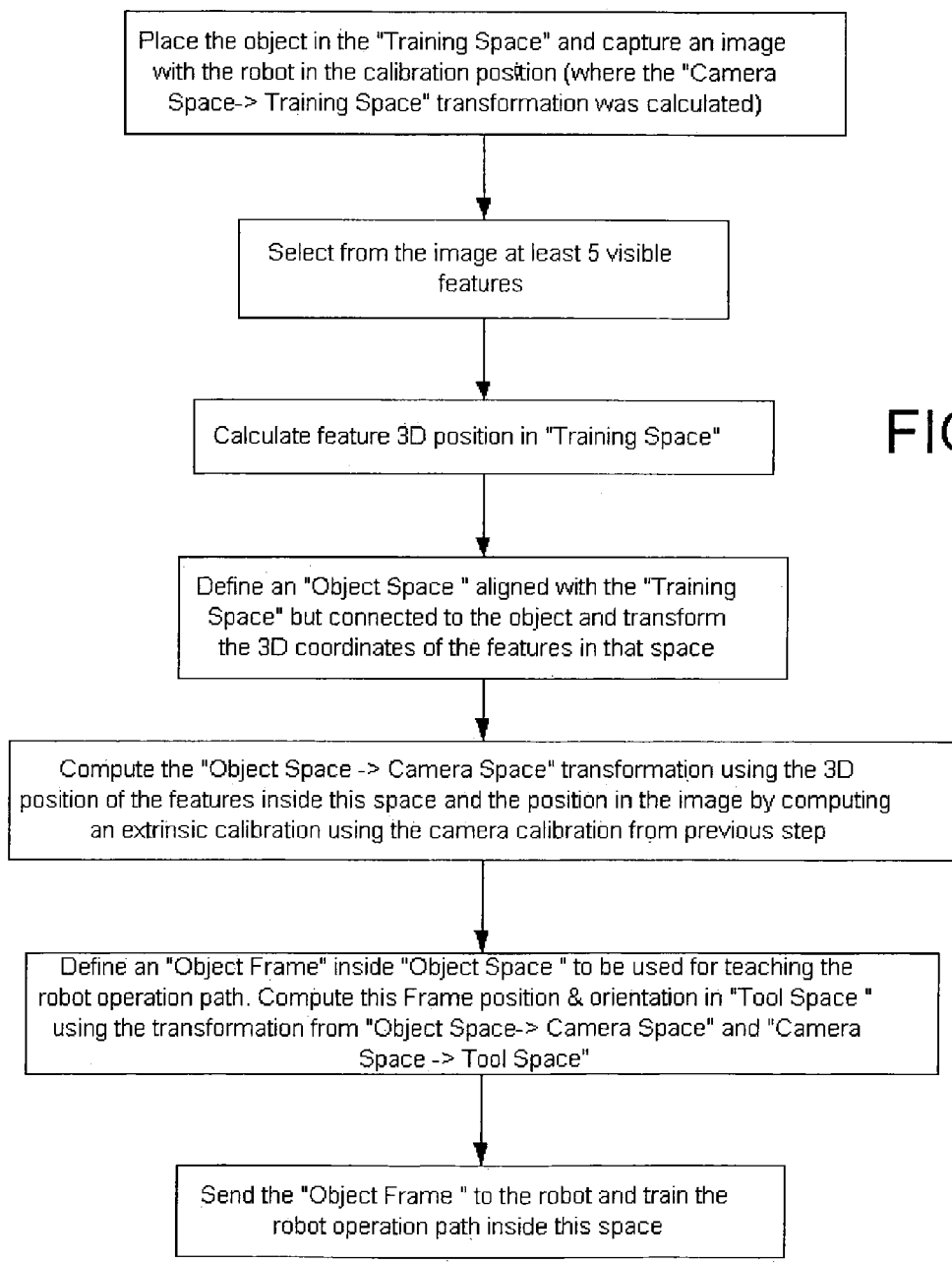
FIG. 6 is a flow chart illustrating the method of teaching the object features and handling path.

As illustrated in FIGS. 3, 4 and 6, the first step in teaching the object features is to place the object in the "Training Space" and capture an image with the robot in the calibration position (where the "Camera Space→Training Space" transformation was calculated). FIG. 4 illustrates the image 50 of the part as displayed on the operator's computer screen. Next, at least 5 visible features 54 are selected. Preferably at least one anchor feature 52 is selected from the image and a set of at least 4 other visible features 54 are selected and positioned relative to the anchor feature. The 3D position of each feature 54 is then calculated in "Training Space" using the height of the feature relative to the Training Space and "Camera Space→Training Space" transformation. An "Object Space" is then defined as having a constant relationship with the "Training Space" but connected to the object and the 3D coordinates of the features are transferred into that space. The "Object Space→Camera Space" transformation is computed using the 3D position of the features inside this space and the position in the image by computing an extrinsic calibration using the camera calibration from the previous step. Next an "Object Frame" inside "Object Space" is defined to be used for teaching the intended operation path. This Object Frame position and orientation in "Tool Frame" is computed using the transformation from "Object Frame→Camera Space" and "Camera Space→Tool Space". The "Object Frame" is then sent to the robot and the intended operation path is trained inside this space.

The following method may also be used for computing the 3D position of the selected features 54 automatically, without any prior knowledge about the part. The following algorithm is developed using the approach described in Guo-Quing Wei,. "Active Self-Calibration of Robotic Eyes and Hand-Eye Relationship with Model Identification", *IEEE Transactions on Robotics and Automation*, Vol. 14, No. 1, February 1999 p. 158. The camera is rigidly mounted on the robot gripper. The derived method computes the world coordinates of the features based on robot motion parameters, known camera to tool transformation, image coordinate measurements and intrinsic camera parameters. The robot tool will undergo a set of pure translations from a base position $P_0$ to a set of positions $P_j$.

The motion equations for a point $P_i$ in the image are:

$$u_{ij} - u_0 = f_x \frac{R_{cg(0,0)} * t_{g0j0} + R_{cg(1,0)} * t_{g0j1} + R_{cg(2,0)} * t_{g0j2} + X_0}{R_{cg(0,2)} * t_{g0j0} + R_{cg(1,2)} * t_{g0j1} + R_{cg(2,2)} * t_{g0j2} + Z_0}$$

$$v_{ij} - v_0 = f_y \frac{R_{cg(0,1)} * t_{g0j0} + R_{cg(1,1)} * t_{g0j1} + R_{cg(2,1)} * t_{g0j2} + Y_0}{R_{cg(0,2)} * t_{g0j0} + R_{cg(1,2)} * t_{g0j1} + R_{cg(2,2)} * t_{g0j2} + Z_0}$$

Where:
j represents the index of the station where the measurement takes place;
$R_{cg}$ are elements of the rotation matrix of the camera to tool transformation;
$t_{g0j}$ represents the translation from the current station to the base position;
$u_0, u_0$ is the camera central point;
$u_{ij}, v_{ij}$ are the undistorted image coordinates of the i-th feature in the image acquired at station j. To compute these values one uses the already calibrated cameras intrinsic parameters.

At least two stations are needed for the linear system to have unique solutions, but a set of at least 3 stations is used in order to compensate for the noise in the images and other perturbation factors that may occur.

$X_0, Y_0, Z_0$ are computed for all the features in camera space, but the values can be transposed in any other space that is related to it, such as training space, tool space or even robot base space. The space in which the coordinates are represented makes no difference as this space is only used to compute the current transformation to the camera and to transfer then the object frame points to the tool space.

The robot stations are located on a circle around the base to assure a uniform distribution.

The automatic feature position finding steps are as follows:
a) the part is positioned in front of the camera 16;
b) the features 54 that are going to be used for 3D part positioning are selected;
c) the automatic feature position finding procedure is started by:
   i) moving the robot to a set of stations around the base 22;
   ii) memorizing the tool position relative to base at each station;
   iii) at each station acquiring an image, finding the visible features 54 and for those features calculating the undistorted image position;
d) for each feature solve a linear system of as many equations as the number of images the given feature was visible in;

e) the calculated positions are transformed in a space that suits the application.

Alternatively the location of the features can be sourced by using a CAD model of the part.

1. Object Location & Robot Guidance

To carry out object location and robot guidance, the following steps are carried out:

a) The tool 14 is positioned in any predefined position above the bin with objects 18.

b) An image of the object 18 is captured.

c) The trained features 54 are searched for. If any anchor features were selected, then a first search is done for the anchor features 52. Using the position and orientation of the anchor features 52 the rest of the features 54 can be found by their relative positions. This approach allows similar features to be selected as features are searched in a relatively small region of interest. Otherwise, each feature is searched over the entire image.

d) The position (in the image 50 and in the Object Space) of the found features (at least 5) are used to calculate the transformation between the Object Space and the Camera Space using an extrinsic calibration algorithm. (See the Tsai article above). The found position is used to re-orient the camera to "look" at the object from an orthogonal position which is the one used at training. This last step may be necessary if the object has major rotations, since in this case the features may be distorted and the found position may not be completely accurate.

e) Steps c) and d) above are repeated.

f) The previous "Object Space to Camera Space" transformation is used in conjunction with the "Camera Space to Tool Space" transformation to find the position of the Object Frame in Tool Space.

g) The Object Frame is then sent to the robot to be used as the reference frame for the robot's operation path.

Figure 7:
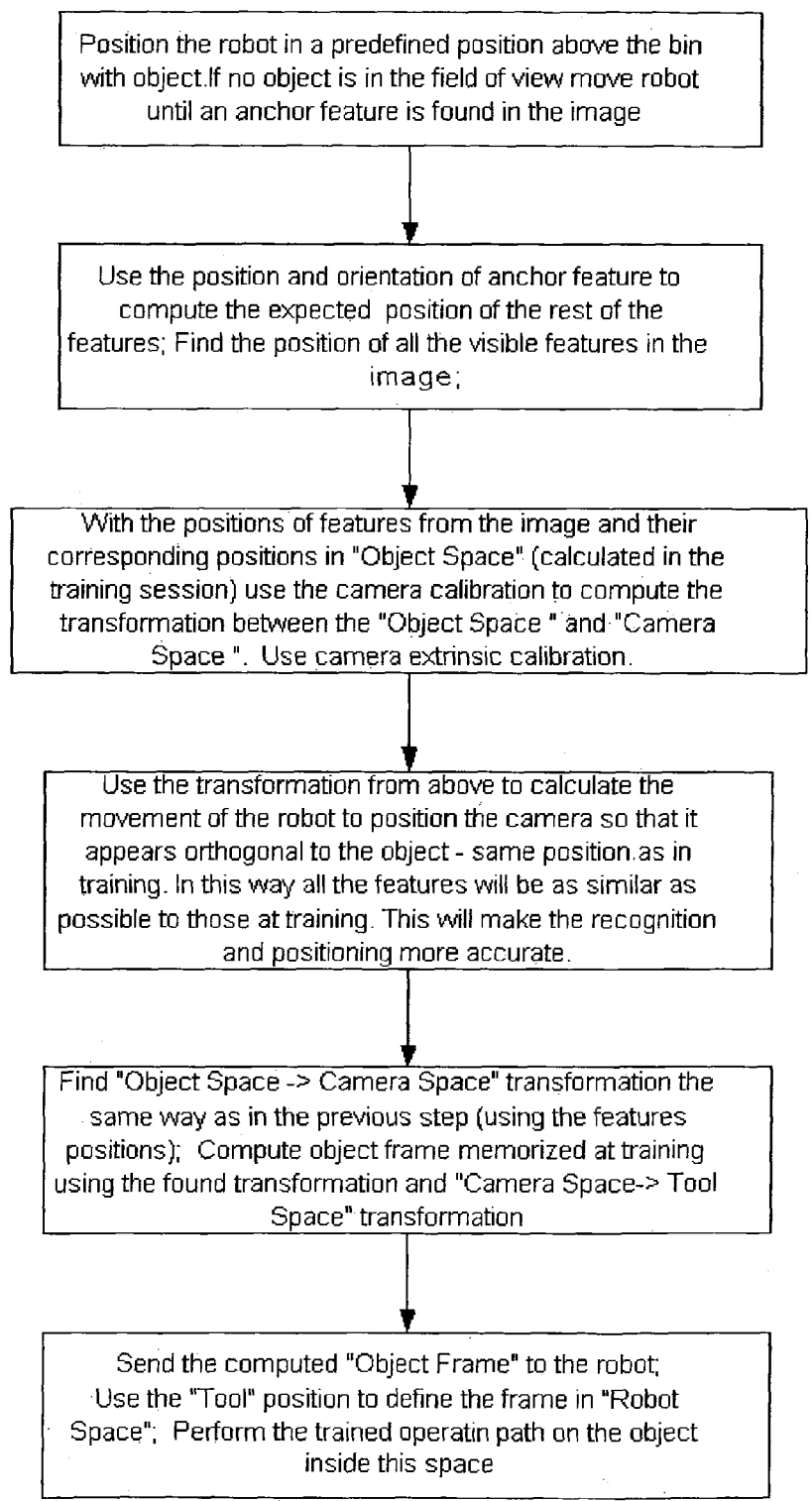
FIG. 7 is a flow chart illustrating the method of object positioning and handling.

With reference to FIG. 7, the preferred steps to carry out object location and robot guidance are illustrated. First the robot is positioned in a predefined position above the bin or container that holds the target object. If no object is in the field of view, the robot is moved until at least one anchor feature is found in the image. Next, the position and orientation of the anchor feature is used to compute the position of the rest of the features. The position of all the visible features in the image is found. With the positions of features from the image and their corresponding positions in "Object Space" (calculated during teaching) the camera calibration is used to compute the transformation between the "Object Space" and "Camera Space". The camera extrinsic calibration is used as described in the Tsai article referenced above.

Next the transformation described above is used to calculate the movement of the robot to position the camera so that it "looks" orthogonally at the object, namely the same position as in training. In this way all the features will appear as similar as possible as at training. This will make the recognition and positioning more accurate. Next the "Object Space→Camera Space" transformation is found in the same way as in the previous step (using the features positions). The Object Frame memorized at training is computed using the found transformation and "Camera Space→Tool Space" transformation. Next, the commuted "Object Frame" is sent to the robot. The "Tool" position is used to define the frame in "Robot Space". The trained robot path is performed inside this space.

Thus methods for teaching robots and handling of objects by robots in three dimensions using one camera mounted on the robot arm are disclosed in which targets are used on objects. The targets are usually normal features of the object or could be created using markers, lighting, etc. It is not necessary to use the CAD model of the object according to this method. The objects need not be fixtured and can be placed anywhere within the workspace of the robot. While the method has been described for one trained object, the process can be used in the same manner to first recognize the object and then find its location in three dimensions. Also the method has been described for one visible set of features selected on one side of the object, but it can be extended to all the sides that can appear in a working situation.

In the method described above, the calibration step can be carried out with just the intrinsic and hand-eye calibration, and in that case, in teaching step b), the 3D position of features may be provided using the CAD model of the object. Similarly the 3D position of features can be calculated automatically, without any model or measurements on the part.

Further, training step c) can be accomplished by sending to the robot the positions of intended robot path points, with the positions computed using the object's current position and orientation. The robot path points can be sourced from an offline robot programming software application. Also, one or more features on the object can be used as grasp points and the position of those points in robot coordinates sent to the robot to eliminate the need for manually teaching grasp points using the robot teach pendant. Alternatively the coordinates of the object frame points or other points of interest (e.g. robot path points) can be transformed using the transformation from tool to robot base and all the coordinates send to robot in the robot base coordinate frame instead.

Further, the calibration and teaching steps a) and b) can be combined by using a self calibration method of robotic eye and hand-eye relationship with model identification as described in "Active self-calibration method of robotic eye and hand-eye relationship with model identification" by Guo-Qing Wei, Klaus Arbter and Gerd Hirzinger. The result of such a method will give camera intrinsic parameters, hand-eye calibration and position of selected features in camera space; The rest of the path training and run time will still remain the same and in this preferred approach;

In accordance with the present invention the determination of object location in step c(i) and d(ii) can use any of the following algorithms:

a) 3D pose estimation using non linear optimization methods derived from-the ones described in the already mentioned articles:
  "A Flexible New Technique for Camera Calibration" by Zhengyou Zhang;
  "An efficient and Accurate Camera Calibration Techniques for 3D Machine Vision" by Roger Y. Tsai;

b) 3D pose estimation from lines correspondence (in which case selected features will be edges) as described in "Determination of Camera Location from 2D to 3D Line and Point Correspondences" by Yucai Liu, Thomas S. Huang, Olivier D. Faugeras;

c) pose estimation using "orthogonal iteration" described in "Fast and Globally Convergent Pose Estimation from Video Images" by Chien_Ping Lu, Gregory D. Hager, Eric Mjolsness;

d) approximate object location under weak perspective conditions as demonstrated in "Uniqueness of 3D Pose Under Weak Perspective: A Geometric Proof" by Thomas Huang, Alfred Bruckenstein, Robert Holt, Arun Netravali;

e) approximate object location using Direct Linear Transformation (DLT) as described in "An investigation on the accuracy of three-dimensional space reconstruction using Direct Linear Transformation techniques" by Chen, Armstrong, Raftopoulos.

In addition to use in robotics, the described method can be applied to a variety of industrial and non-industrial processes whereby knowledge of the 3D pose of an object is required.

While the invention has been described using a single camera, the image may be formed using multiple sensors ("Sensor Array"). For instance, the formation of a single image may be accomplished using multiple cameras that are situated such that the origins of their camera spaces are coincident. In this fashion, each camera would view a different area of the part with some overlap with the areas viewed by adjacent cameras. A single image is then formed by "Mosaicing" the images from individual cameras similar to one described in Multiple View Geometry in Computer Vision by Richard Hartley and Andrew Zisserman, Cambridge University Press, 2000. The same image formation may be accomplished by mounting a single camera on a robot and rotating the camera about its origin of the camera space and capturing the multiple images needed for Mosaicing. The object features may be extracted from multiple images captured by the same sensor array located in the same position whereby each image is formed under a different combination of lighting and filters to highlight a group of object features that are not apparent in other images. The object features themselves may be created using markers, lighting or other means.

The calibration and teaching steps may be accomplished by using a self calibration method of robotic eye and hand-eye relationship with model identification.

The creation of the Object Model may be accomplished by using the relative heights of features and the "Robot—Eye Calibration" or by the operator entering the 3D position of each feature manually from a CAD model, measurement or other source.

While the invention has been described with the camera mounted on the robot, the same approach is valid for cases whereby the camera is fixed onto a stationary structure. Similarly although the object has been described to be at rest on a surface, the same approach is valid for cases when the object is stationary but grasped by a robot. Also during the operation of the system there may exist a relative velocity between the sensor array and the object wherein step d) is executed in a continuous control loop and provides real time positional feedback to the robot for the purpose of correcting the intended robot operation path.

Where the camera is mounted on the robot, the calibration step is accomplished by: i) the operator moving the "Calibration Model" relative to the camera and capturing images at multiple positions to determine camera intrinsic parameters; ii) the operator taking an image of the "Calibration Model" at a stationary position to determine the extrinsic calibration parameters; iii) the operator determining the position of the "Calibration Model" in the robot space using the robot end-effector while the "Calibration Model" is at the same position as in step ii); and iv) calculating the "Robot—Eye Calibration" using results of i), ii), iii). The step of creating the Object Model is accomplished by using the relative heights of features and the "Robot—Eye Calibration".

Where the camera is fixed onto a stationary structure and the object is at rest upon a surface, the calibration step is accomplished by mounting the "Calibration Model" on the robot and using the robot to automatically move the "Calibration Model" relative to the camera and capturing images at multiple known robot positions. The step of creating the Object Model is accomplished by the operator entering the 3D position of each feature manually from a CAD model, measurement or other source.

Where the camera is fixed onto a stationary structure and the object is in a robot's grasp such that the position and orientation of the object can be modified by known values, the calibration step is accomplished by mounting the "Calibration Model" on the robot and using the robot to automatically move the "Calibration Model" relative to the camera and capturing images at multiple known robot positions. The step of creating the Object Model is accomplished by using the robot to automatically move the object relative to the camera and capturing images at multiple known robot positions. If when locating the features a sufficient number of features are not found in the field of view of the camera, the relative position and/or orientation of the object is changed until sufficient features are found. Prior to communicating the object location to the robot, the necessary movement of the object relative to the camera is calculated using the transformation between the "Object Space" and "Robot Frame" such that the relative position and orientation of the object and the camera is similar to that at the time of training; the relative movement is executed as calculated in previous step; and the "Object Space→Sensor Array Space" transformation is found in the same way as in step d) ii).

Where the object is at rest and stationary and the camera is attached onto the robot such that its position and orientation can be modified by known values, the calibration step is accomplished by placing the "Calibration Model" in the camera's field of view and using the robot to automatically move the camera relative to the "Calibration Model" and capturing images at multiple known robot positions. The step of creating the Object Model is accomplished by using the robot to automatically move the camera relative to the object and capturing images at multiple known robot positions. If when locating the features a sufficient number of features are not found in the field of view of the camera, then the relative position and/or orientation of the camera is changed until sufficient features are found. In this case the step of (step b) iii)) is accomplished by using the robot to automatically move the camera relative to the object and capturing images at multiple known robot positions, and wherein step c) iii) is accomplished by creating a new frame called the "Object Frame" that is in constant relationship with the "Object Space" and sending the "Object Frame" to the robot and training the intended operation path relative to the "Object Frame" and step d) iii) is accomplished by computing the "Object Space" inside the "Robot Frame" using the transformation between the "Object Space" and the "Sensor Array" and the "Robot—Eye Calibration" and calculating and sending the "Object Frame" to the robot and executing the robot path relative to the "Object Frame", and wherein the following steps are preceded by d) ii) and followed by d) iii):

a. calculating the necessary movement of the object relative to the camera using the transformation between the "Object Space" and "Robot Frame" such that the relative position and orientation of the object and the camera is similar to that at the time of training;
b. executing the relative movement as calculated in previous step;
c. finding the "Object Space→Sensor Array Space" transformation in the same way as in step d) ii), and
wherein step d) i) the search area for some of the features is based upon the position and orientation of some other features. Prior to communicating the object location to the robot, the necessary movement of the object relative to the camera is calculated using the transformation between the "Object Space" and "Robot Frame" such that the relative position and orientation of the object and the camera is similar to that at the time of training; the relative movement is executed as calculated in previous step; and the "Object Space→Sensor Array Space" transformation is found in the same way as in step d) ii).

Where the object is in a robot's grasp such that its position and orientation can be modified by known values and the camera is attached onto another robot such that its position and orientation can be modified by known values, the calibration step is accomplished by placing the "Calibration Model" in the camera's field of view and using the robot to automatically move the camera relative to the "Calibration Model" and capturing images at multiple known robot positions. The step of creating the Object Model is accomplished by changing the relative position of the object and camera using movement of one or both robots and capturing images at multiple known robots' positions. If when locating the features a sufficient number of features are not found in the field of view of the camera, then the relative position and/or orientation of the camera and/or object is changed until sufficient features are found. Prior to communicating the object location to the robot, the necessary movement of the object relative to the camera is calculated using the transformation between the "Object Space" and "Robot Frame" such that the relative position and orientation of the object and the camera is similar to that at the time of training; and the relative movement is executed as calculated in previous step; and the "Object Space→Sensor Array Space" transformation is found in the same way as in step d) ii).

Various means are possible for communicating the object location data to the robot. The "Object Space" may be communicated to the robot and the intended operation path trained relative to the "Object Space" and then communication of the object location to the robot is accomplished by computing the "Object Space" inside the "Robot Frame" using the transformation between the "Object Space" and the "Sensor Array" and the "Robot—Eye Calibration" and sending the "Object Space" to the robot and executing the robot path relative to the "Object Space". Alternatively the "Object Space" may be memorized and step d) iii) is accomplished by calculating the transformation between the memorized "object space" and the current "object space" and communicating this transformation to the robot to be used for correcting the operation path points. Or the "Object Space" may be memorized and step d) iii) is accomplished by calculating the transformation between the memorized "object space" and the current "object space" and using this transformation to modify the robot operation path points and communicating the modified path points to the robot for playback.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A useful in three-dimensional pose estimation for use with a single camera mounted to a movable portion of a robot, the method comprising:
    capturing a two-dimensional image of a volume containing a target object;
    locating a number of features in the captured image of the target object; and
    determining by a processor an object space-to-camera space transformation for the target object based at least in part on a position of at least some of the located features using only the single captured image and an algorithm that employs a known or determinable physical relationship between at least some of the located features.

2. The method of claim 1, further comprising:
    capturing a number of images of a calibration object by the camera;
    determining a set of intrinsic parameters of the camera from at least one of the number of images of the calibration object captured by the camera; and
    determining a set of extrinsic parameters of the camera from at least one of the number of images of the calibration object captured by the camera, the set of extrinsic parameters comprising a camera space-to-training space transformation defining a transformation between a camera space reference frame and a training space reference frame.

3. The method of claim 2, further comprising:
    positioning the camera with respect to the calibration object.

4. The method of claim 3 wherein positioning the camera with respect to the calibration object comprises positioning the camera orthogonally with respect to a ruled template with a number of features, where a known or determinable physical relationship exists between at least some of the features.

5. The method of claim 3 wherein positioning the camera with respect to the calibration object comprises positioning the camera with respect to a sample of a type of object the robot will manipulate, the sample having a number of features, where a known or determinable physical relationship exists between at least some of the features.

6. The method of claim 3 wherein capturing a number of images of a calibration object by the camera comprises capturing at least one image at each of a plurality of positions spaced perpendicularly from the calibration object.

7. The method of claim 3 wherein capturing a number of images of a calibration object by the camera comprises capturing at least one image at each of a plurality of different orientations with respect to the calibration object.

8. The method of claim 2 wherein determining a set of intrinsic parameters of the camera from the at least one of the number of images of the calibration object captured by the camera comprises determining at least one of a focal length, a first order radial lens distortion coefficient, a set of coordinates of a center of a radial lens distortion, or a scale factor indicative of a framegrabber scanline resampling uncertainty.

9. The method of claim 2 wherein determining a set of extrinsic parameters of the camera from at least one of the number of images of the calibration object captured by the camera, the set of extrinsic parameters comprising a camera space-to-training space transformation defining a transformation between a camera space reference frame and a training space reference frame comprises determining a respective translation component along three orthogonal axes, and a respective rotation component about the three orthogonal axes.

10. The method of claim 2, further comprising:
    determining a camera space-to-tool space transformation based at least in part on at least two of the number of images captured by the camera of the calibration object.

11. The method of claim 2, further comprising:
    determining a camera space-to-tool space transformation based on single one of the number of images captured by the camera of the calibration object and on a number of physical coordinates of at least one feature of the calibration object.

12. The method of claim 1, further comprising:
    capturing an image of a teaching object of a type of object that will be manipulated by the robot;
    selecting a number of features from the captured image of the teaching object; and determining a set of object space coordinates for each of the selected features from the captured image of the teaching object.

13. The method of claim 12 wherein selecting a number of features from the captured image of the teaching object comprises selecting six features from the captured image of the teaching object.

14. The method of claim 12, further comprising:
determining an object space-to-camera space transformation defining a transformation between an object space reference frame and the camera space reference frame.

15. The method of claim 14, further comprising:
determining a position and an orientation of an object frame in the tool frame reference frame based at least in part on the object frame-to-camera space and camera space-to-tool space transformations.

16. The method of claim 15, further comprising:
providing the position and orientation of the object frame to the robot; and
training an intended operation path inside the object frame.

17. The method of claim 1, further comprising:
adjusting a position of the movable portion of the robot if the number of features located in the captured image of the target object is determined to be an insufficient number of features; and
capturing another two-dimensional image of the volume containing the target object before determining the object space-to-camera space transformation for the target object.

18. The method of claim 1, further comprising:
determining at least one movement of the robot that orients the camera orthogonally with respect to the target object based at least on part on the object space-to-camera space transformation.

19. The method of claim 18, further comprising:
determining a position of the object frame in the tool space reference frame; and
providing an object frame to the robot.

20. An apparatus useful in robotics, the apparatus comprising:
a single camera operable to capture a number of images of a calibration object;
means for calibrating the camera, by:
determining a set of intrinsic parameters of the camera from at least one of the number of images of the calibration object captured by the camera; and
determining a set of extrinsic parameters of the camera from at least one of the number of images of the calibration object captured by the camera, the set of extrinsic parameters comprising a camera space-to-training space transformation defining a transformation between a camera space reference frame and a training space reference frame; and
means for estimating a pose of a target object, by:
capturing a two-dimensional image of a volume containing a target object; and
locating at least six features in the captured image of the target object; and
determining an object space-to-camera space transformation based at least in part on a position of at least some of the located features in solely the captured image using an algorithm that employs a known or determinable physical relationship between at least some of the located features.

21. The apparatus of claim 20, further comprising:
means for training, comprising:
capturing an image of a teaching object of a type of object that will be manipulated by the robot;
selecting a number of features from the captured image of the teaching object;
determining a set of object space coordinates for each of the selected features from the captured image of the teaching object; and
determining an object space-to-camera space transformation defining a transformation between an object space reference frame and the camera space reference frame.

22. The apparatus of claim 21 wherein the means for calibrating, the means for estimating a pose, and the means for training comprises at least one programmed computer.

23. The apparatus of claim 21 wherein the means for calibrating, the means for estimating a pose, and the means for training comprises at least one computer-readable medium storing instructions operating at least one computer.

24. The apparatus of claim 20 wherein the pose estimating means estimates the pose of the target object further by:
adjusting a position of the movable portion of the robot if the number of features located in the captured image of the target object is determined to be an insufficient number of features.

25. An apparatus useful in robotics, the apparatus comprising:
a single camera operable to capture a number of images of a calibration object;
means for calibrating the camera, by:
determining a set of intrinsic parameters of the camera from at least one of the number of images of the calibration object captured by the camera; and
determining a set of extrinsic parameters of the camera from at least one of the number of images of the calibration object captured by the camera, the set of extrinsic parameters comprising a camera space-to-training space transformation defining a transformation between a camera space reference frame and a training space reference frame; and
means for estimating a pose of a target object, by:
capturing a two-dimensional image of a volume containing a target object;
locating at least five features in the captured image of the target object; and
determining an object space-to-camera space transformation based at least in part on a position of at least some of the located features using the captured image without any additional captured images and an algorithm that employs a known or determinable physical relationship between at least some of the located features.

26. The apparatus of claim 25 wherein the means for calibrating and the means for estimating a pose comprises at least one programmed computer.

27. The apparatus of claim 25 wherein the means for calibrating and the means for estimating a pose comprises at least one computer-readable medium storing instructions operating at least one computer.

28. The apparatus of claim 25 wherein the pose estimating means estimates the pose of the target object further by:
adjusting a position of the movable portion of the robot if the number of features located in the captured image of the target object is determined to be an insufficient number of features.

* * * * *

UNITED STATES PATENT AND TRADEMARK OFFICE
CERTIFICATE OF CORRECTION

Page 1 of 1

PATENT NO.        : 8,095,237 B2
APPLICATION NO.   : 10/634874
DATED             : January 10, 2012
INVENTOR(S)       : Babak Habibi et al.

It is certified that error appears in the above-identified patent and that said Letters Patent is hereby corrected as shown below:

Column 11, Line 54:
"1. A useful in three-dimensional pose estimation for use" should read,
--1. A method useful in three-dimensional pose estimation for use--.

Signed and Sealed this
Seventeenth Day of July, 2012

David J. Kappos
*Director of the United States Patent and Trademark Office*